United States Patent [19]
Arlow

[11] 3,718,859
[45] Feb. 27, 1973

[54] ELECTRIC CIRCUIT TEST ELEMENT FOR USE WITH A PAIR OF ELECTRICAL CONNECTORS

[75] Inventor: Michael S. Arlow, Livonia, Mich.

[73] Assignee: The United States of America as represented by the Secretary of the Army

[22] Filed: Feb. 1, 1971

[21] Appl. No.: 111,296

[52] U.S. Cl. ............324/72.5, 324/51, 324/158 F, 339/156 R, 339/194 R
[51] Int. Cl. .....................H01r 13/50, G01r 31/02
[58] Field of Search .....324/72.5, 149, 23, 158 F, 51; 339/156 R, 156 T, 194 R, 194 N

[56] References Cited

UNITED STATES PATENTS

| | | | |
|---|---|---|---|
| 2,548,991 | 4/1951 | McNabb | 324/51 |
| 2,795,664 | 6/1957 | Conrad | 324/23 X |
| 3,340,491 | 9/1967 | Deakin | 339/194 R |
| 2,448,452 | 8/1948 | Morelock | 324/158 F |
| 2,732,533 | 1/1956 | Andrews et al. | 339/156 T |

Primary Examiner—Gerard R. Strecker
Attorney—Harry M. Saragovitz, Edward J. Kelly, Herbert Berl and John F. Schmidt

[57] ABSTRACT

A pair of harness connectors have sandwiched between them a test connector or element which carries on its external cylindrical surface a number of test circuit terminals, one for each pin in the test element. The leads between the test circuit terminals and the test element pins, as well as the terminals themselves, may be printed circuits. A meter is tapped onto any given test circuit terminal and is provided with a probe so it can be grounded. The test element is divided into two or three discs so it can accommodate a greater number of circuits to be tested.

5 Claims, 7 Drawing Figures

MICHAEL S. ARLOW
INVENTOR
BY
H.M. Saragovitz, E.J. Kelly
H. Berl & John F. Schmidt
ATTORNEYS MICHAEL S. ARLOW
INVENTOR
BY
H.M. Saragovitz, E.J. Kelly
H. Berl & John F. Schmidt
ATTORNEYS MICHAEL S. ARLOW
INVENTOR
BY
H.M. Saragovitz, E.J. Kelly
H. Berl & John F. Schmidt
ATTORNEYS

ELECTRIC CIRCUIT TEST ELEMENT FOR USE WITH A PAIR OF ELECTRICAL CONNECTORS

BACKGROUND OF THE INVENTION

1. Field of the Invention

This invention relates to devices to test electric circuits, and especially electronic circuits, while the connected electric or electronic device is in operation.

2. Description of the Prior Art

There are many closed loop electronic circuits in industrial applications and in mobile equipment, such as military equipment, for which qualification, test, and check-out procedures are highly desirable and, in case of failure, actually necessary. The troubleshooting of electronic circuits can be greatly simplified and expedited if they can be monitored while in operation. Moreover, in many applications, a wiring harness transmits power both to and from a so called "black box." Disconnecting such a harness for test or check purposes interrupts a closed loop circuit and thus disrupts unit operation. Ideally, all units should be tested under dynamic rather than static conditions, and this is not usually possible with conventional troubleshooting methods and equipment, which require lengthy, indirect and expensive routines.

SUMMARY OF THE INVENTION

The invention is a test element which is used with the two connectors of a pair of connectors in an electric circuit, usually in a wiring harness for an electronic device. The test element is series compatible with the pair of harness connectors for which it is designed, and consists of a support carrying a plurality of contacts extending through the support and adapted on each face of the support to engage electrically the corresponding terminals of the two connectors of said pair, which in many cases will mean that one end of a contact in the support will be a plug and the other end a socket to engage respectively a socket terminal and a plug terminal in the connectors of the pair with which the test element is used.

THE DRAWINGS

Figure 1:
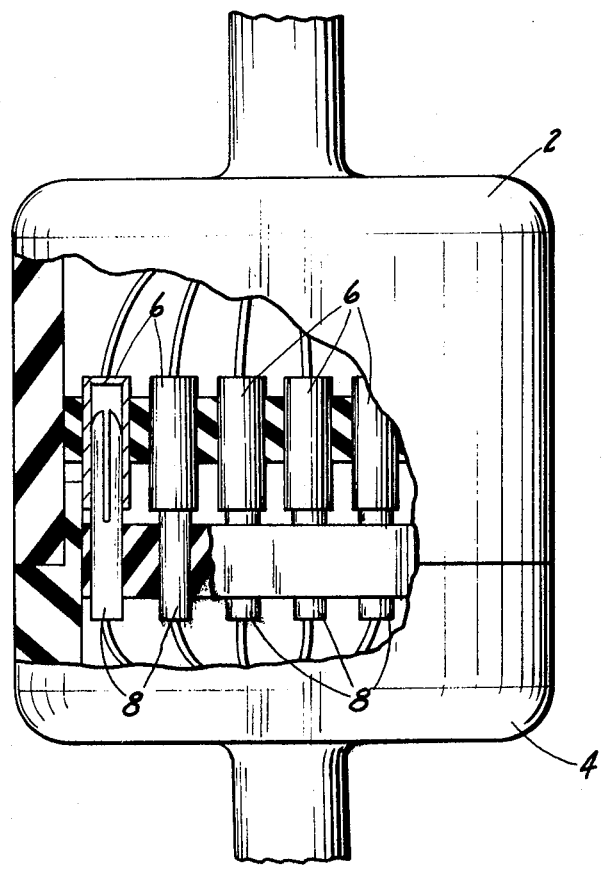
FIG. 1 is a plan view, with parts broken away and in section, of a pair of conventional connectors with which the invention is to be used.
Figure 2:
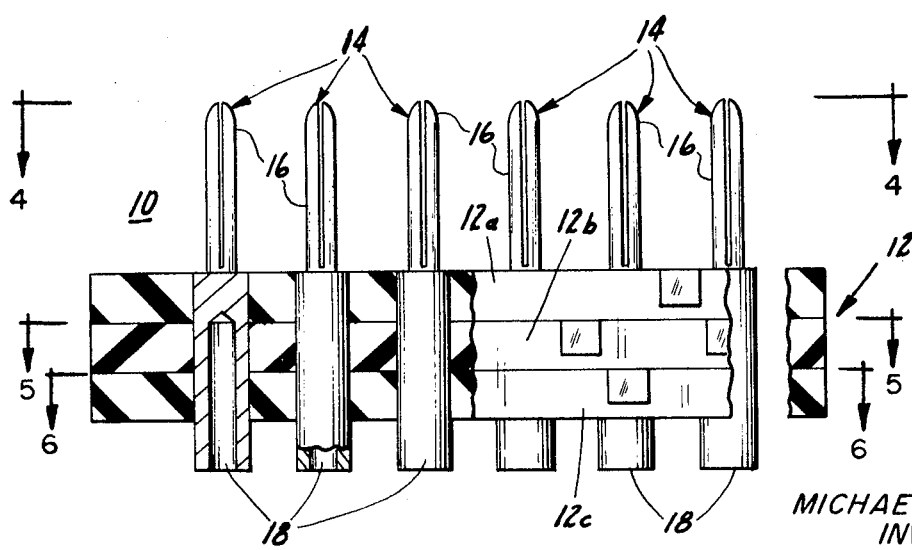
FIG. 2 is a view in elevation, with parts broken away and in section, of an electric circuit test element made according to this invention.

Referring now more specifically to the drawings and in greater detail, FIG. 1 shows a pair of connectors 2 and 4 of a conventional type. In the embodiment here shown, connector 2 is provided with a plurality of socket terminals 6 which make electrical contact with plug terminals 8 in connector 4.

Cooperable with the connectors 2 and 4 is a test element 10 made in accordance with the invention. The embodiment here shown provides a three-part support 12 for a plurality of contacts 14. Support 12 comprises a plurality, here shown as three, of discs 12a, 12b and 12c. Each contact 14 passes through or traverses all of the discs in order to provide means electrically to engage the terminals of connectors adjacent its two faces. Because connectors 2 and 4 here shown are provided with socket and plug terminals 6 and 8 respectively, each of contacts 14 correspondingly comprises a plug portion 16 and a socket portion 18.

Figure 4:
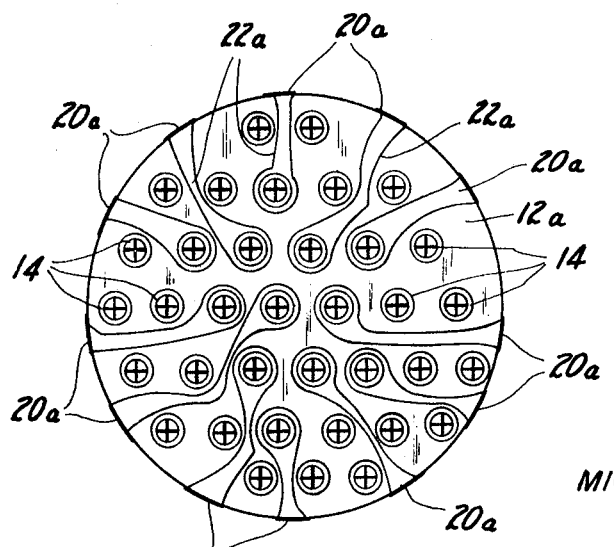
FIG. 4 is a view substantially on line 4—4 of FIG. 2.
Figure 5:
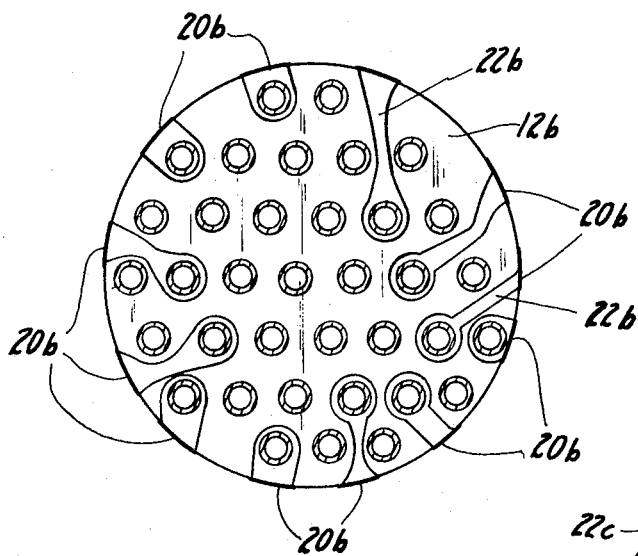
FIG. 5 is a view substantially on line 5—5 of FIG. 2.
Figure 6:
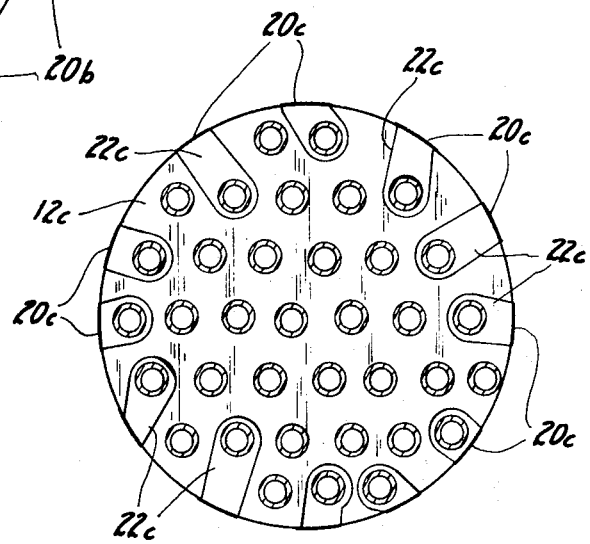
FIG. 6 is a view substantially on line 6—6 of FIG. 2.

Making support 12 in more than one part makes it possible to concentrate a larger number of contacts in one test element without interference between the several terminals and their leads to an external test circuit terminal. As can be seen from a consideration of FIGS. 4, 5 and 6, the test element here shown carries 36 contacts for engagement with the 36 terminals of connectors 2 and 4. Each contact 14 must be provided with a test circuit terminal and must be electrically connected with its terminal. Thus, a test circuit terminal 20 is provided for each contact 14, being connected by a suitable lead 22, the test circuit terminals and leads being here shown as 20a, 20b, 20c and 22a, 22b, 22c for discs 12a, 12b, 12c respectively. If all 36 electrical connecting means, or leads, 22a, 22b, and 22c had to be placed on one surface, they would interfere to the extent of leakage from one contact to another, arcing across, or simply shorting across because of insufficient space. The problem is substantially averted by distributing the leads on three surfaces as shown in FIGS. 4, 5 and 6.

Figure 3:
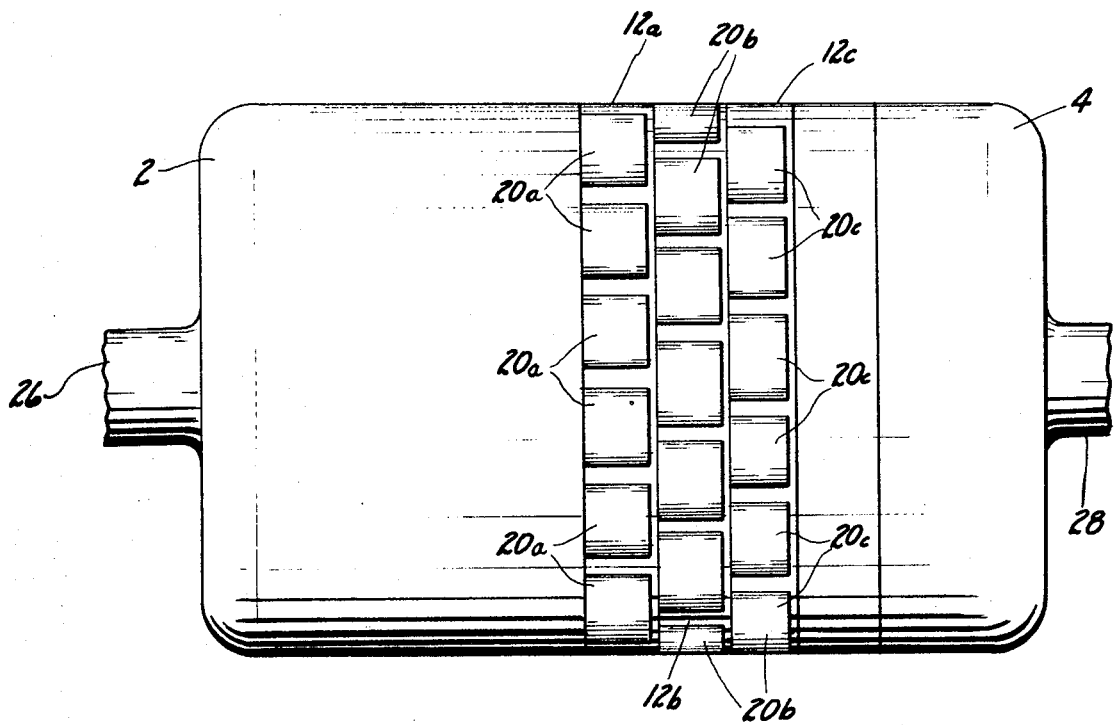
FIG. 3 is a view in elevation of a pair of connectors of a wiring harness, shown assembled with a test element embodying this invention.

Test circuit terminals 20 are placed so as to be readily accessible when test element 10 is assembled with a pair of connectors as in FIG. 3. In the configuration of the illustrated embodiment of the invention, the external or accessible surface, with the connectors and the test element assembled, available to hold the test circuit terminals 20 is the cylindrical surface of the three-part element 10 which appears in FIG. 3.

In a preferred embodiment of the invention, test circuit terminals 20 and leads 22 can take the form of printed circuits suitably connected, as by soldering, with their respective contacts 14. Terminals 20 can be numbered or otherwise marked with distinguishing indicia for identification, by means of a tabular code or key, with the associated circuit. The connectors and the test element may be suitably polarized so as to be assemblable in only the desired orientation, with the result that any given test circuit terminal in the test element is always connected with the same circuit when the test element is plugged into the harness for which it is designed.

OPERATION

Figure 7:
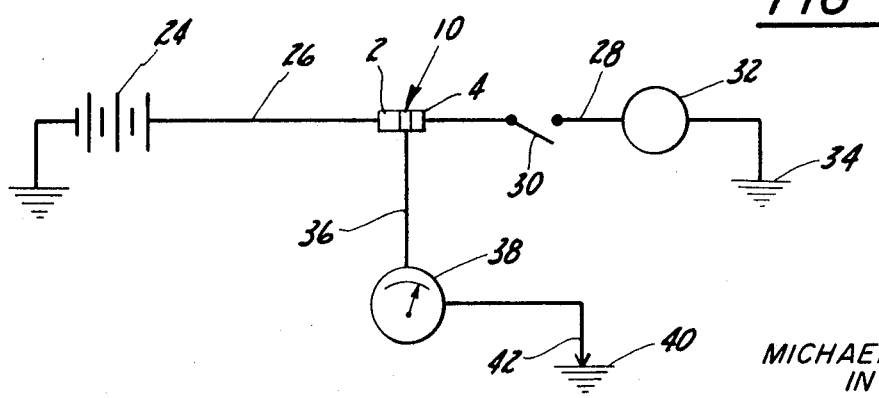
FIG. 7 is a schematic view of a wiring harness circuit showing an application of a test element made according to this invention.

Reference is now made to FIG. 7 for a discussion in detail of the application of a test element made according to this invention. Any suitable power source 24, here shown as a battery, is connected with a harness having a cable 26 to which connector 2 is electrically joined. Between connectors 2 and 4, the test element 10 is disposed, being plugged into both connectors as in FIG. 3. A cable 28 is electrically joined with connector 4 and may if desired include one or more switches such as the one shown at 30. An electronic device 32 is shown connected in the harness. Device 32 would account for at least one of the circuits of the harness and could of course be of such a nature as to be connected with all of the circuits in the harness. In many cases, device 32 will be grounded as shown at 34.

An instrument lead 36 is shown connected with test element 10. As will be understood by those skilled in the art, lead 36 will contact the appropriate test circuit terminal 20 as determined by the indicia and the tabular key to enable an operator to plug into whatever circuit is to be tested. A multimeter 38 is shown as being connected with lead 36 and as grounded at 40, the ground 40 here being shown schematically as provided by suitable conventional test probe 42.

I wish it to be understood that I do not desire to be limited to the exact details of construction shown and described, for obvious modifications will occur to a person skilled in the art.

What is claimed is:

1. A test element for use with a pair of electrical connectors having plug and socket terminals, the element comprising a nonconductive support composed of a plurality of discs, a plurality of electrically conductive elongated one piece integral metal contacts held by the support and each of which has a plug portion and a socket portion wherein the two portions are coaxial and are cooperable with a socket terminal and a plug terminal respectively of said pair, a test circuit terminal for each of said contacts on said support and accessible from outside the assembled pair and support, and means electrically connecting each test circuit terminal with a contact, each disc carrying a proportionate share of test circuit terminals on its periphery and a corresponding proportionate share of said electrical connecting means.

2. A test element for use with a pair of electrical connectors, each connector carrying a plurality of terminals adapted to make electrical contact with the terminals of the other connector and the two connectors being engageable and disengageable to make and break respectively said electrical contact between terminals, the invention comprising a nonconductive support positionable between the two connectors and composed of a plurality of discs, a plurality of elongated electrically conductive one piece integral metal contacts held by said support, each contact having a plug adapted to engage a terminal in one connector and having coaxial with the plug a socket which in transverse section is integral and receives the corresponding terminal in the other connector to establish an electric circuit between said two terminals when said support is positioned between and in engagement with said two connectors, a test circuit terminal for each of said contacts, the test circuit terminals mounted on said support and accessible from outside the assembled connectors and support, and means electrically connecting each test circuit terminal with a contact.

3. A test element as in claim 2, wherein the socket portion of each of said contacts is supported by each of said plurality of discs.

4. A test element for use with a pair of electrical connectors, each connector carrying a plurality of terminals adapted to make electrical contact with the terminals of the other connector and the two connectors being engageable and disengageable to make and break respectively said electrical contact between terminals, the invention comprising a nonconductive support positionable between and in engagement with said two connectors, and when in such engagement having an exposed surface, the support composed of a plurality of discs, a plurality of elongated electrically conductive one piece integral metal contacts held by the support, each contact passing through the support and having a plug adapted to engage a terminal in one connector and having coaxial with the plug a socket which in transverse section is integral and receives the corresponding terminal in the other connector to establish an electric circuit between said two terminals when the support is between and in engagement with the two connectors, a test circuit terminal for each of said contacts, said test circuit terminals mounted on said exposed surface of said support, and means electrically connecting each test circuit terminal with a contact.

5. A test element as in claim 4, wherein the socket portion of each of said contacts is supported by each of said plurality of discs.

* * * * *